April 1, 1958 — W. C. HOCH — 2,828,664
FINDER FOR MULTIPLEX CAMERAS
Filed Jan. 27, 1953
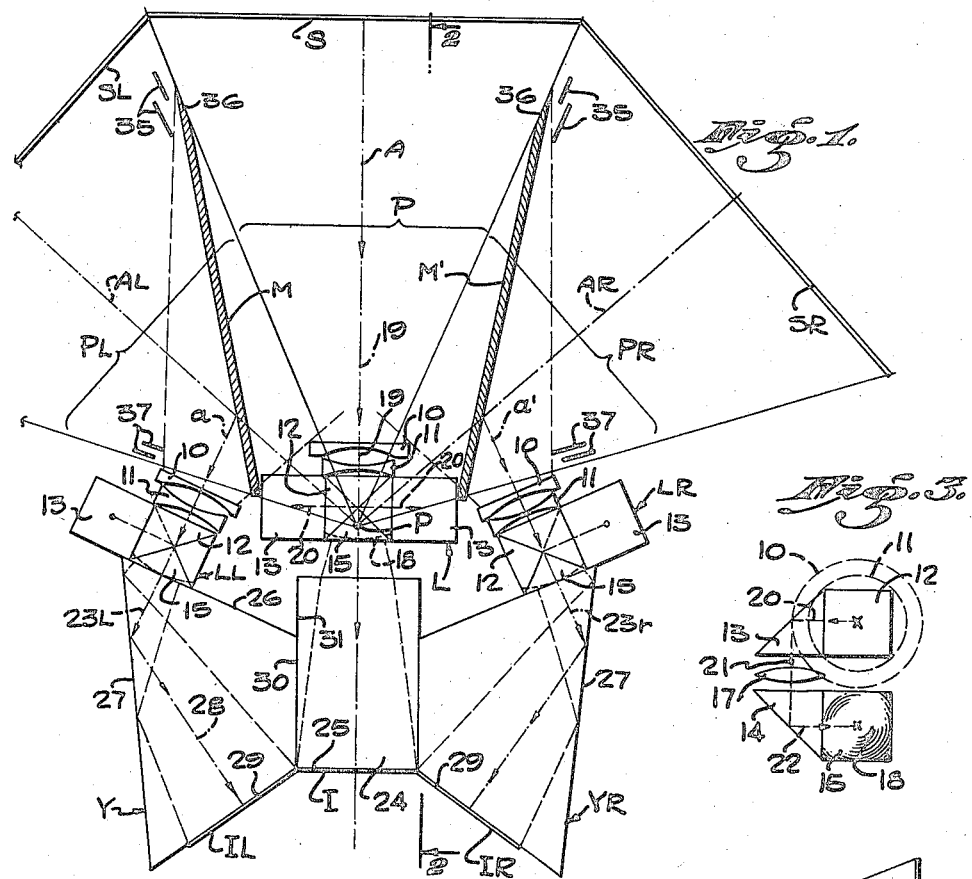
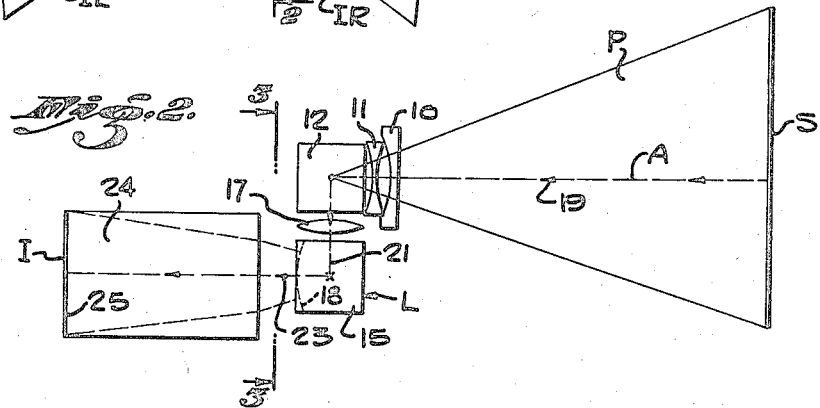
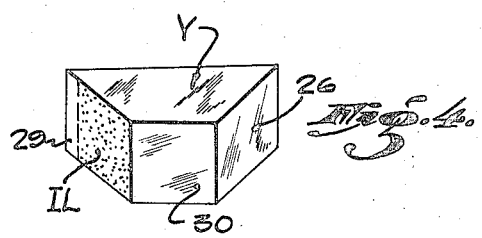
WINTON C. HOCH,
INVENTOR.
BY
ATTORNEY United States Patent Office 2,828,664
Patented Apr. 1, 1958

2,828,664

FINDER FOR MULTIPLEX CAMERAS

Winton C. Hoch, Los Angeles, Calif., assignor, by mesne assignments, to Cinerama, Inc., New York, N. Y., a corporation of New York Application January 27, 1953, Serial No. 333,437

6 Claims. (Cl. 88—1.5)

My invention relates in general to finders such as used with photographic cameras and relates in particular to a finder especially adapted for use with a multiplex camera such as disclosed in my copending application, Serial No. 333,436 for Method and Means for Producing a Picture Comprising a Plurality of Adjacent Images, filed January 27, 1953.

It is an object of the invention to provide a multiplex finder of simple form which will produce for observation by the cameraman side-by-side images of the adjacent scenes in the laterally extended field of the multiplex camera with which the finder is used.

A further object of the invention is to provide a multiplex finder which will present to the view of an observer side-by-side erect images, the contiguous edges of which are merged so that the several images present a single continuous image of the adjacent scenes which the multiplex camera will photograph upon separate image recording means.

A further object of the invention is to provide a multiplex finder having optical means for defining imaginary adjacent pyramids having at the bases thereof the adjacent scenes which are to be photographed and having their apices substantially meeting at a point, such optical means including lens systems which produce images of the separate scenes in side-by-side relation in such a manner that parallax is substantially avoided and magnification in the images is equalized so that the separate images merge and form a continuous image comprehending the separate images.

It is a further object of the invention to provide in this multiplex finder optical means arranged on the axis of one of the pyramids for directly receiving light from one of the scenes and including lens means for focusing an image of the scene in an image plane, and also to provide reflecting means placed in crossing relation to the axis of another of the pyramids to reflect light from another of said scenes to a second optical means arranged to produce an image of the second scene sidewardly of the image of the first scene, the images being in the same relationship as the scenes from which the images are derived.

A further object of the invention is to provide in a finder such as described in the preceding paragraph, means for inserting in the path of light from the converging lens means of one of the lens systems a body of refractive material adapted to extend the image distance of the lens means so as to bring its image into side-by-side relation to the image of an adjacent scene, and to provide louvre means arranged adjacent marginal portions of the pyramids for blocking of light which would produce ghost images.

Further objects and advantages of the invention may be set forth in the following portion of the specification wherein I have described a preferred embodiment of the invention for the purpose of acquainting those skilled in the art with the principles and elements of the invention, without limiting the scope of the invention defined in the appended claims nor limiting the range of equivalents to which the invention may be entitled.

Referring to the drawings which are for illustrative purposes only:

Fig. 1 is a schematic plan view of the combination of optical elements entering into my new finder;

Fig. 2 is an elevational view of the central portion of the finder taken from the position indicated by the line 2—2 of Fig. 1;

Fig. 3 is an elevational view of the prismatic elements entering into the lens system, this elevational view being taken from the position indicated by the line 3—3 of Fig. 2;

Fig. 4 is a perspective view of a prism employed in Fig. 1.

In Fig. 1, I schematically show a central scene S and adjacent angularly disposed scenes SL and SR arranged to the left and to the right respectively of the scene S, which are to be photographed by a multiplex camera such as disclosed in my hereinbefore mentioned copending application Serial No. 333,436. These scenes are disposed at the bases of optically defined pyramids P, PL and PR respectively having object axes A, AL and AR which meet at a point P. It will be understood that the scenes S, SL and SR comprise object images for the lens systems of the finder which will be later described. Such scenes may consist of vertical surfaces arranged in side-by-side relation and in the object focal planes, or such scenes may consist of objects disposed in, in front of or to the rear of the object focal planes of the lenses of the finder. The finder comprises lens systems L, LL and LR which are matched, at least in so far as their inception characteristics are concerned, and which respectively focus light value images of the scenes S, SL and SR on image planes I, IL and IR. These image planes are disposed in side-by-side relation and present to the operator of the multiplex camera side-by-side images of the scenes and since the viewed images are in side-by-side relation, and are erect, they present to the viewer a continuous image of the entire field of the three lens systems L, LL and LR represented by the scenes S, SL and SR.

The following description of the lens system L is also a description of the component parts of the lens systems LL and LR, the lens system LR differing from the other two only in orientation of equivalent image erecting prisms. Referring to Figs. 1, 2 and 3, the lens system L includes reducing lenses 10 and 11 followed by an erecting prism system comprising four 90° prisms 12, 13, 14 and 15. A duo-convex positive lens 17 is placed between the adjacent faces of the prisms 13 and 14 and a planoconvex lens 18 is formed on the rear face of the prism 15. The direction of movement of light through the lens system L is indicated by arrows disposed on separate reflected portions of the optical axis. The light passes through the lens 10 and 11, as indicated by arrows 19, to the prism 12 which reflects the light laterally to the prism 13, as indicated by arrows 20. The prism 13 reflects the light downwardly, as indicated by arrows 21 through the lens 17 to the prism 14 which, as indicated by arrows 22 reflects the light laterally to the prism 15 arranged to reflect the light forwardly through the planoconvex lens 18. As indicated by arrows 23, the light is passed through a glass block 24 to the rear face 25 thereof which, in the present embodiment of the invention, coincides with the image plane I. The lens system L is arranged upon the object axis A in such position that its object field is substantially the same as the pyramid P, but slightly larger so that the object image picked up by the lens system L will slightly overlap the edges of the scene S.

Mirrors M and M' are disposed in crossing relation to the objects axes AL and AR to reflect to opposite sides the light which travels outwardly from the scenes SL and SR toward the point P, such reflection of light being along the reflected object axes a and a' to lens systems LL and LR which are arranged to respectively receive from the mirrors M and M' light from the scenes SL and SR and to focus the same on left-hand and right-hand image planes. A prism Y is arranged to receive the image carrying light which issues from the optical system LL as indicated by arrows 23L. This prism Y has a light receiving face 26 perpendicular to the optical axis represented by the arrows 23L, and a reflective face 27 positioned so that it will reflect the light as indicated by arrows 28 to a surface 29 which corresponds to the image plane IL and in which surface 29 the light value image of the screen SL is formed, the rightward edge of this image merging with the leftward edge of the image formed in the image plane I.

The prism Y, in the form of the invention disclosed has the faces 26, 27 and 29 thereof arranged to define substantially an equilateral triangle. The inner corner of the prism is cut off to provide a face 30 which will lie against the face 31 of the glass block 24.

The light from the scene SR, reflected by the mirror M' passes into the lens system LR along the reflected axis a' and the image carrying light which leaves the lens system LR, as indicated by arrows 23r, passes into a prism YR which differs from the prism Y only in that it is oriented 180° around the axis A. The reflective surface 27 of this prism YR reflects the image to the face 29 of the prism YR which coincides with the image plane YR which receives the image of the right scene SR. The prisms Y and YR, and the prisms of the lens assemblies LL and LR constitute glass paths for the light from the converging lenses of the lens systems LL and LR effective to extend the image focal distances of the respective lens systems and to establish the image planes IL and IR in such positions that the inner edges thereof will be contiguous to the side edges of the image plane I.

The observer has before him in the adjacent image planes IL, and IR the adjacent images of the scenes SL, S and SR in the form of a laterally elongated picture of the objects presented by the three scenes which are to be photographed.

Louvres 35 are arranged adjacent the forward edges 36 of the mirrors M and M' for blocking off ghost-producing light from the scenes, and for the same purpose louvres 37 are arranged adjacent the distal portions of the lenses 10.

I claim:

1. A finder for a multi-lens camera for photographing adjacent scenes that are to be projected as a mosaic picture, said finder comprising a plurality of lenses corresponding to the lenses of the camera with which the finder is intended to be used, a plurality of image screens corresponding to the respective lenses of the finder, a first optical system associated with one of the finder lenses and located between that lens and its image screen, said first optical system including reflector means that direct the light rays from the lens to make the image on the screen behind that optical system erect and with sides corresponding with those of the imaged scene, a reflector in front of a second lens of said finder lenses and covering the entire optical field of said second lens and disposed in position to reflect into said second lens a scene contiguous with that imaged through the first optical system, and a second optical system associated with said second lens and located between that lens and its image screen, said second optical system including reflector means that direct the light rays from the lens to make the image on the screen behind that optical system erect and with sides corresponding with those of the scene imaged through said second lens, the image screens of the finder being contiguous to one another to obtain a picture with sides corresponding to the scene before the lenses.

2. The finder described in claim 1 and in which the optical systems for the different lenses include erecting prisms and reflecting surfaces that correct the sides of the images.

3. The finder described in claim 2 and in which the optical systems for the different lenses are similar, and there is an additional reflector surface in the light beam to the image screen of the second lens in position to reflect the entire cross section of said light beam to compensate the change of sides resulting from the reflection of the light rays by said reflector in front of the second lens.

4. The finder described in claim 1 and in which the second lens and the reflector in front of said second lens are in position to image a scene which overlaps to some extent the scene imaged by the first lens of the finder.

5. The finder described in claim 1 and in which there are three finder lenses and three image screens including a center lens and screen, a lens to the right and another lens to the left of the center lens supplying light to image screens contiguous to the right and left edges, respectively, of the center image screen, and there are different reflectors in front of the right and left lenses, the reflectors converging toward one another as they extend toward their lenses.

6. The finder described in claim 5 and in which the lenses are oriented to face in diverging directions and are correlated to cause the three scenes imaged by the finder to be formed by light beams that converge along optical axes that project to a common meeting point.

References Cited in the file of this patent

UNITED STATES PATENTS

| 973,961 | Oliver | Oct. 25, 1910 |
| 1,666,304 | Proctor | Apr. 17, 1928 |
| 1,735,109 | Eliel | Nov. 12, 1929 |
| 2,021,507 | Hanks | Nov. 19, 1935 |
| 2,622,495 | Jensen | Dec. 23, 1952 |

FOREIGN PATENTS

| 198,815 | Great Britain | June 14, 1923 |
| 405,612 | Great Britain | Jan. 26, 1934 |